(12) United States Patent
Olczak et al.

(10) Patent No.: US 7,452,490 B2
(45) Date of Patent: *Nov. 18, 2008

(54) METHOD AND APPARATUS FOR FABRICATING A LIGHT MANAGEMENT SUBSTRATES

(75) Inventors: Eugene Olczak, Glenville, NY (US); Erwin W. Liang, Ballston Lake, NY (US)

(73) Assignee: Sabic Innovative Plastics IP B.V. (NL)

( * ) Notice: Subject to any disclaimer, the term of this patent is extended or adjusted under 35 U.S.C. 154(b) by 307 days.

This patent is subject to a terminal disclaimer.

(21) Appl. No.: 10/908,160

(22) Filed: Apr. 29, 2005

(65) Prior Publication Data

US 2005/0199501 A1 Sep. 15, 2005

Related U.S. Application Data

(62) Division of application No. 10/248,099, filed on Dec. 18, 2002, now Pat. No. 6,952,627.

(51) Int. Cl.
*B29D 11/00* (2006.01)

(52) U.S. Cl. .................. 264/2.5; 205/79; 264/1.38; 264/219

(58) Field of Classification Search .................. 264/1.1, 264/2.5, 1.36, 1.38, 219; 425/808; 700/190, 700/191; 205/79
See application file for complete search history.

(56) References Cited

U.S. PATENT DOCUMENTS

| | | | |
|---|---|---|---|
| 467,208 A | 1/1892 | Strobel | |
| 2,403,731 A | 7/1946 | MacNeille | 88/65 |
| 4,542,449 A | 9/1985 | Whitehead | 362/330 |
| 4,576,850 A | 3/1986 | Martens | 428/156 |
| 4,906,070 A | 3/1990 | Cobb, Jr. | 350/286 |
| 4,984,144 A | 1/1991 | Cobb, Jr. et al. | 362/339 |
| 5,056,892 A | 10/1991 | Cobb, Jr. | 359/831 |
| 5,439,621 A * | 8/1995 | Hoopman | 264/2.5 |

(Continued)

FOREIGN PATENT DOCUMENTS

WO WO 98/33006 7/1998

(Continued)

OTHER PUBLICATIONS

Text of First Chinese Office Action—Application No. 2003801063633.

(Continued)

*Primary Examiner*—Mathieu D. Vargot
(74) *Attorney, Agent, or Firm*—Cantor Colburn LLP (57) ABSTRACT

A method of machining a surface of a workpiece is accomplished by bringing a cutting tool into contact with the surface of the workpiece and for at least one cutting pass, i, causing relative movement between the cutting tool and the surface of the workpiece along a path in the surface of the workpiece. The path is in the nature of a mathematical function defined over a segment, C, of a coordinate system and characterized by a set of nonrandom, random or pseudorandom parameters selected from the group consisting of amplitude, phase and period or frequency. Relative movement between the cutting tool and the surface of the workpiece may be accomplished by bandpass filtering a noise signal; providing the bandpass filtered signal to a function generator; generating a randomly modulated mathematical function from the function generator; and in response to the randomly modulated function, directing the relative movement between the cutting tool and the surface of the workpiece along the path in the surface of the workpiece.

9 Claims, 13 Drawing Sheets

U.S. PATENT DOCUMENTS

| | | | |
|---|---|---|---|
| 5,771,328 A | 6/1998 | Wortman et al. | 385/146 |
| 5,861,990 A | 1/1999 | Tedesco | 359/599 |
| 5,917,664 A | 6/1999 | O'Neill et al. | 359/831 |
| 5,919,551 A | 7/1999 | Cobb, Jr. et al. | 428/156 |
| 6,002,829 A | 12/1999 | Winston et al. | 385/146 |
| 6,044,196 A | 3/2000 | Winston et al. | 385/146 |
| 6,052,164 A | 4/2000 | Cobb, Jr. et al. | 349/64 |
| 6,091,547 A | 7/2000 | Gardiner et al. | 359/625 |
| 6,108,131 A | 8/2000 | Hansen et al. | 359/486 |
| 6,208,463 B1 | 3/2001 | Hansen et al. | 359/486 |
| 6,243,068 B1 | 6/2001 | Evanicky et al. | 345/102 |
| 6,277,471 B1 | 8/2001 | Tang | 428/172 |
| 6,280,063 B1 | 8/2001 | Fong et al. | 362/333 |
| 6,322,236 B1 | 11/2001 | Campbell et al. | 362/333 |
| 6,335,999 B1 | 1/2002 | Winston et al. | 385/146 |
| 6,354,709 B1 | 3/2002 | Campbell et al. | 362/31 |
| 6,356,391 B1 | 3/2002 | Gardiner et al. | 359/638 |
| 6,456,437 B1 | 9/2002 | Lea et al. | 359/625 |
| 6,952,627 B2 * | 10/2005 | Olczak et al. | 700/191 |
| 2002/0061178 A1 | 5/2002 | Winston et al. | 385/146 |
| 2002/0080598 A1 | 6/2002 | Parker et al. | 362/31 |
| 2002/0097496 A1 | 7/2002 | Lu | 359/628 |
| 2002/0101659 A1 | 8/2002 | Hansen et al. | 359/486 |
| 2004/0051987 A1 | 3/2004 | Bauer et al. | |

FOREIGN PATENT DOCUMENTS

| | | |
|---|---|---|
| WO | WO 99/42861 | 8/1999 |
| WO | WO 99/59005 | 11/1999 |
| WO | WO 99/63397 | 12/1999 |
| WO | 00/48037 A2 | 8/2000 |
| WO | WO0048037 | 8/2000 |
| WO | WO 01/27527 | 4/2001 |
| WO | WO 01/27663 | 4/2001 |
| WO | WO 01/79923 | 10/2001 |
| WO | WO0226651 | 4/2002 |

OTHER PUBLICATIONS

David J. Whitehouse, Handbook of Surface Metrology, IOP Publishing Ltd.; 1994, pp. 49-58.

Max Levy Autograph, Inc. MLA 4000 Series Ultra Precision Micro Machining/Contouring System, Bulletin 2050, Advertisement.

3M Innovation, 3M Brightness Enhancement Film (III) Advertisement.

Backlight Optics, pp. P-2/37-P-2/44.

Machine Design, "Plastic Film Reflects Around the Corner", p. 52, Aug. 1997.

PCT Search Report—PCT/US03/39178.

* cited by examiner

METHOD AND APPARATUS FOR FABRICATING A LIGHT MANAGEMENT SUBSTRATES

CROSS REFERENCE TO RELATED APPLICATIONS

This application is a divisional of U.S. application Ser. No. 10/248,099, filed Dec. 18, 2002, which is incorporated herein by reference.

BACKGROUND OF THE INVENTION

This invention relates to a method and apparatus for fabricating light management films and in particular to such films fabricated from randomly or pseudo randomly mastered surfaces.

In backlight computer displays or other systems, films are commonly used to direct or diffuse light. For example, in backlight displays, brightness enhancement films use prismatic or textured structures to direct light along the viewing axis (i.e., normal to the display), which enhances the brightness of the light viewed by the user of the display and which allows the system to use less power to create a desired level of on-axis illumination. Films for turning light can also be used in a wide range of other optical designs, such as for projection displays, traffic signals, and illuminated signs. Backlight displays and other systems use layers of films stacked and arranged so that the prismatic or textured surfaces thereof are perpendicular to one another and are sandwiched between other optical films known as diffusers. Diffusers have highly irregular or randomized surfaces.

Textured surfaces have been widely used in optical applications such as backlight display films, diffusers, and rear reflectors. In a wide range of optical designs it is necessary to use microstructures to redirect and redistribute light (or diffuse light) to enhance brightness, diffusion, or absorption. For example, in a backlight display system it is often required to both direct the illumination incident on a screen toward a direction normal to the screen and to spread the illumination over the viewer space. Performance of thin-film solar cells can be markedly improved by light trapping based on textured TCO/glass/metal substrates, and angle selective specular reflectors. Microstructures are sometimes randomized for reducing manufacturing defects such as pits and defects from optical interference between two components such as moiré pattern, speckle and Newton's ring. Ideally, an optical film, instead of two or more films together, should have both the performance of brightness enhancement and least defects.

In backlight applications brightness enhancement films and diffuser films are commonly combined as part of a display screen to redirect and redistribute light. In the prior art a typical solution for enhancing brightness is to use an optical film having a surface structured with linear prisms. For example, the prior art describes using a prismatic film to enhance the on-axis brightness of a backlight liquid crystal display. To hide manufacturing defects and decrease the optical coupling, an optical film with structures randomly varying in height along its length direction has been crafted to achieve brightness enhancement while hiding manufacturing defects and reducing optical coupling between two sheets of such film.

BRIEF DESCRIPTION OF THE INVENTION

A method of machining a surface of a workpiece is accomplished by bringing a cutting tool into contact with the surface of the workpiece and for at least one cutting pass, i, causing relative movement between the cutting tool and the surface of the workpiece along a path in the surface of the workpiece. The path is in the nature of a mathematical function defined over a segment, C, of a coordinate system and characterized by a set of nonrandom, random or pseudorandom parameters selected from the group consisting of amplitude, phase and period or frequency.

Relative movement between the cutting tool and the surface of the workpiece may be accomplished by bandpass filtering a noise signal; providing the bandpass filtered signal to a function generator; generating a randomly modulated mathematical function from the function generator; and in response to the randomly modulated function, directing the relative movement between the cutting tool and the surface of the workpiece along the path in the surface of the workpiece.

The invention works by modulating the prism structures of an optical film from the nominal linear path in a lateral direction (direction perpendicular to the height) by using a nonrandom, random (or pseudo random) amplitude and period. Masters for the tools to manufacture films having such microstructures may be made by diamond turning on a cylindrical drum or flat plate. The drum is typically coated with hard copper or Nickel upon which the grooves are either thread or annular cut. The drum is turning while the diamond cutting tool is moving transverse to the turning direction for a thread cut or an annular cut to produce the desired pitch. In order to produce the modulation, a fast tool servo (FTS) system is used to drive the tool laterally. A piezoelectric transducer is used to move the diamond tool to a desired displacement by varying the voltage supplied to the transducer at a random or pseudo random frequency. Both the displacement (amplitude) and the frequency at any instant can be randomly generated in a personal computer and then sent to the amplifier to produce the desired voltage. Because of temperature and hysteresis effects of the piezoelectric materials, a feed back control with a distance probe may be required to ensure the correct tool movement. For modulating the cut in both lateral direction and height, a FTS with two transducers with independent controllers and probes may be used.

The invention reduces the number of components in an optical system and thus reduces cost and weight. Generally it improves optical performance by minimizing many conceivable optical interferences and couplings. The manufacturing methods provide microstructures with more control over the light direction.

The invention provides light enhancement and diffusion without optical artifacts by randomly varying the prism structures in a lateral direction and height. Because of the random component in the lateral direction, the optical defects resulting from interference between two sheets of optical films such as Moiré patterns, speckles and Newton's rings are almost absent. The lateral variation is more effective than the height variation in producing diffusion and reducing optical defects especially the Moiré effect. The randomness of the prism patterns allows blending the joints of machined patches without visible seams. The length of the drum is thus not limited by the cutting tool travel. Lateral motion of the cutting tool has feedback control to ensure precise positioning to overcome hysteresis, creep and temperature to piezoelectric stack. The combination of lateral and height variations provides greater freedom in machining surface microstructures for many applications such as diffusers, solar cell panels, reflectors.

DETAILED DESCRIPTION OF THE INVENTION

Figure 1:
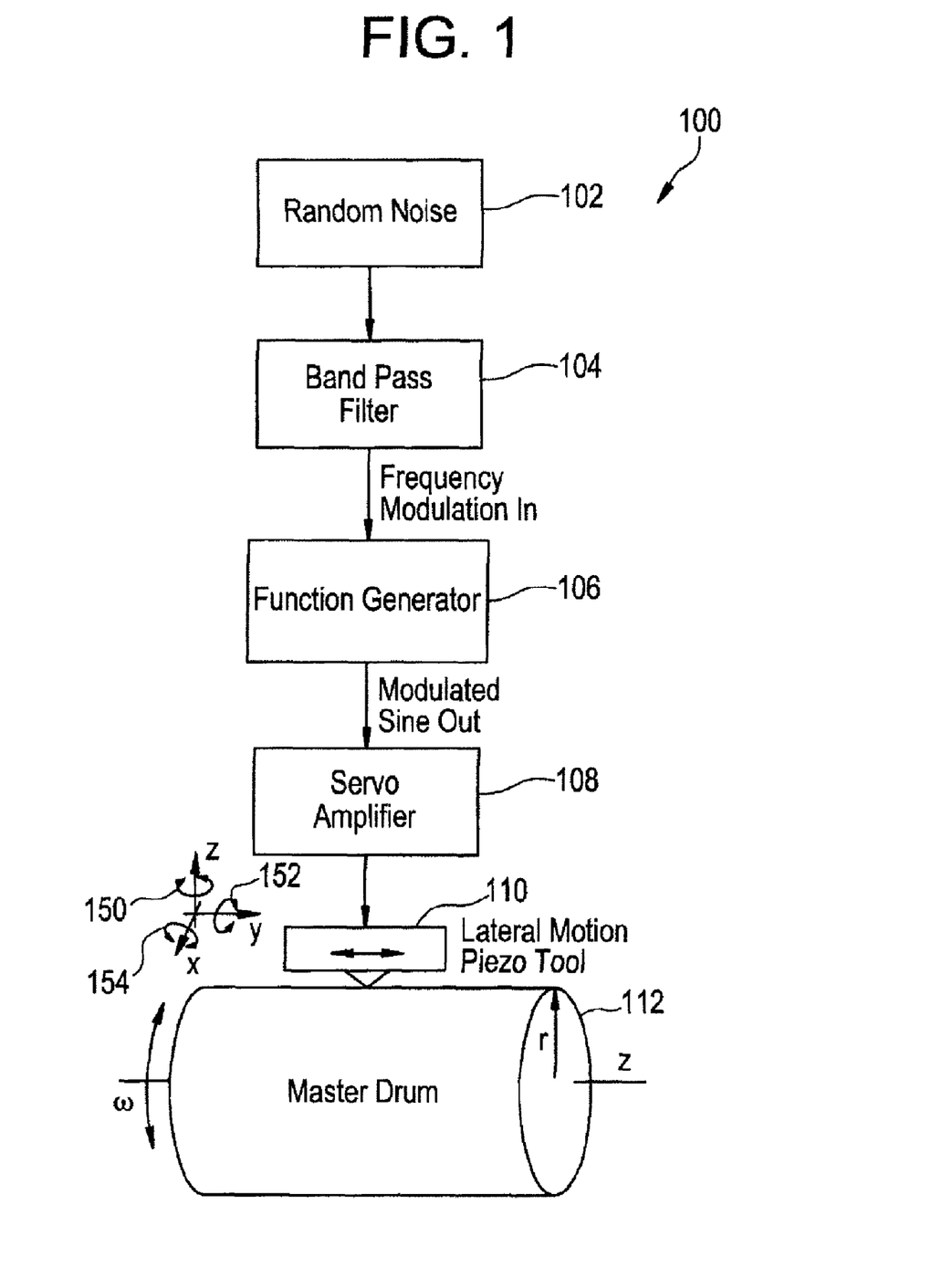
FIG. 1 is a flow chart showing a method of machining a surface of a workpiece wherein the workpiece is a master drum.
Figure 3:
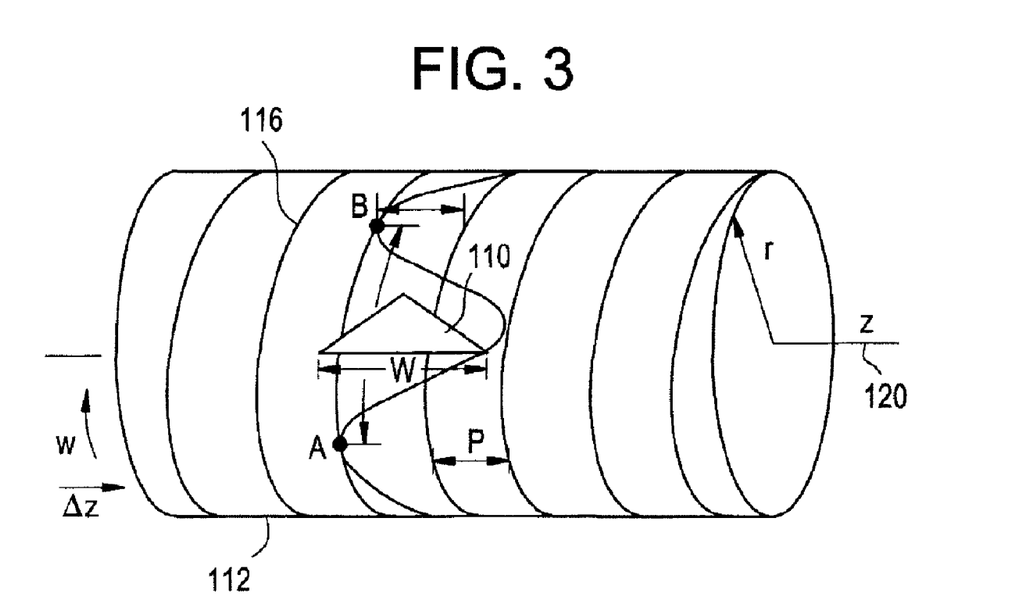
FIG. 3 is a diagram of the master drum of FIG. 1 having a random or pseudo random pattern therein following a generally spiral-like or threaded path.

Referring to FIG. 1, a method of machining a surface of a work piece is shown generally at 100. A noise signal 102 is band pass filtered 104 and provided as input to a function generator 106. A modulated mathematical function, such as a sinusoidal wave form is provided by the function generator 106 as input to a servo mechanism 108. The noise signal 102, the bandpass filter 104 and the function generator 106 can be replaced by a computer system equipped with the appropriate signal processing software and digital-to-analog conversion board so as to generate the input signal to the servo mechanism 108. The servo mechanism 108 directs relative movement between a cutting tool 110 and the surface of a drum 112 rotating at an angular velocity of ω in a cylindrical coordinate system (r,θ,z). As the drum 112 rotates at angular velocity ω, the cutting tool 110 moves relative to the drum 112 along the drum axis, z, and randomly moves back and forth with a frequency of up to about 2,000 Hz parallel to the axis of the drum 112 The cutting tool 110, being in continuous contact with the surface of the rotating drum 110, thus cuts or machines a randomized spiral-like or threaded pattern 116 (FIG. 3) having a pitch, P, into the surface of the drum 112. For a two axis cutting tool 110, the cutting tool moves not only back and forth parallel to the drum axis 112, but also perpendicular to the drum surface to cut different depths in the surface of the drum 112.

Figure 2:
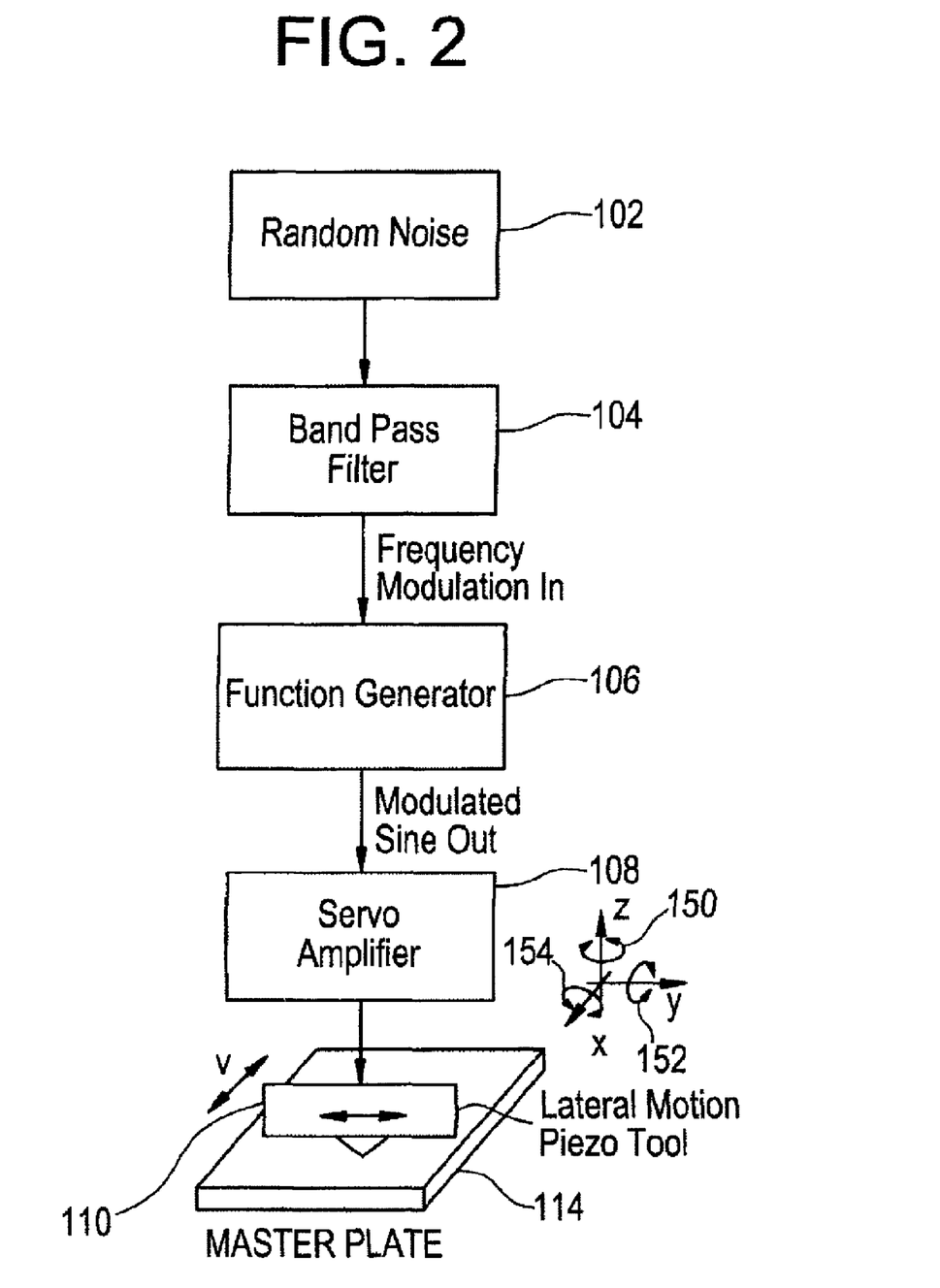
FIG. 2 is a flow chart showing a method of machining a surface of a workpiece wherein the workpiece is on a master plate.
Figure 5:
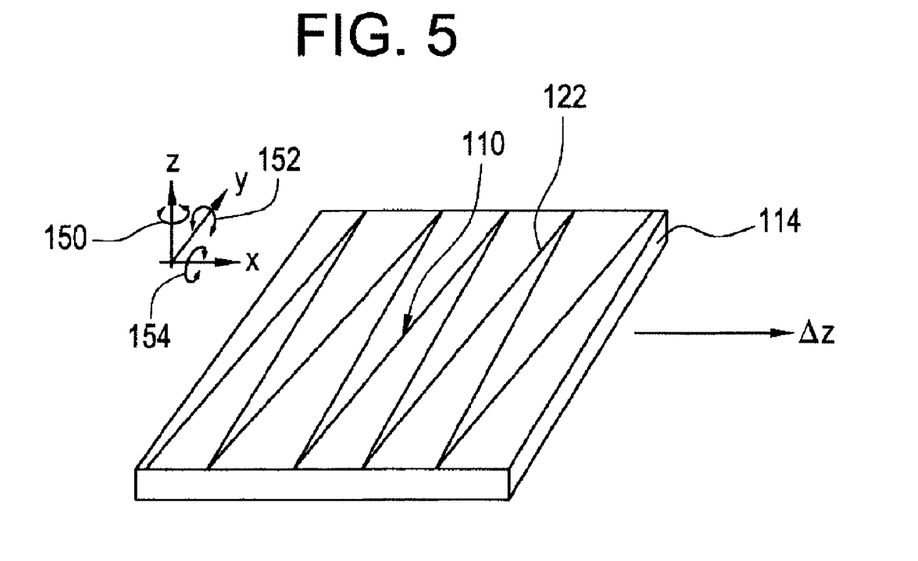
FIG. 5 is a diagram of the master plate of FIG. 2 having a random or pseudo random pattern therein following a generally sawtooth or triangular path.
Figure 6:
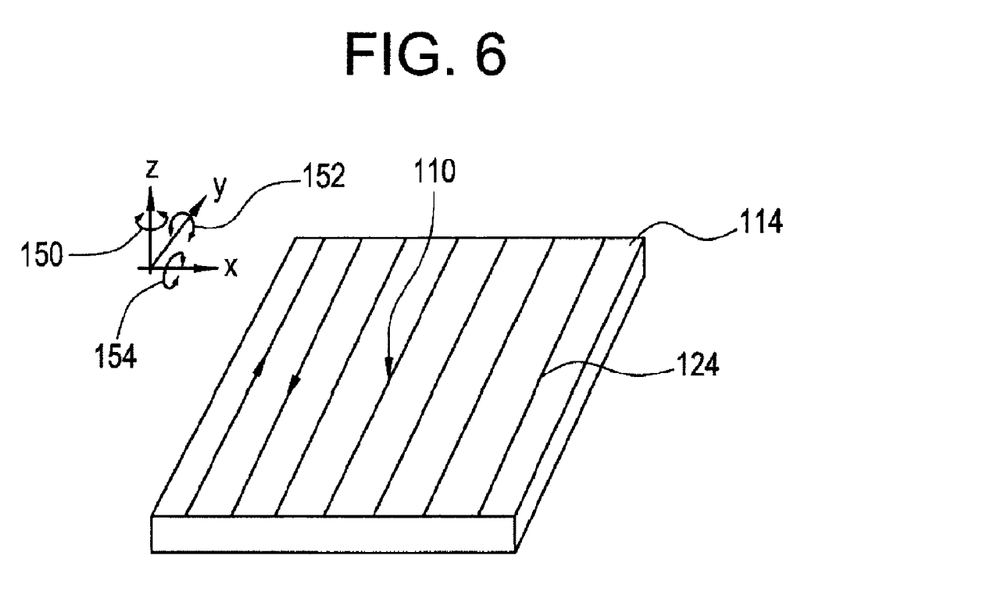
FIG. 6 is a diagram of the master plate of FIG. 2 having a random or pseudo random pattern therein along a series of generally concentric rings.

Alternatively, as seen in FIG. 2, the cutting tool 110 may be in contact with the surface of a flat plate 114 moving at a velocity of v in a rectilinear coordinate system (x,y,z). Similarly, as the plate 114 moves at velocity v, and the cutting tool 110, randomly moves back and forth across the plate, the cutting tool 110, being in continuous contact with the surface of the plate 114, thus cuts or machines a randomized triangular pattern 122 (FIG. 5) into the surface of the plate 114.

Figure 4:
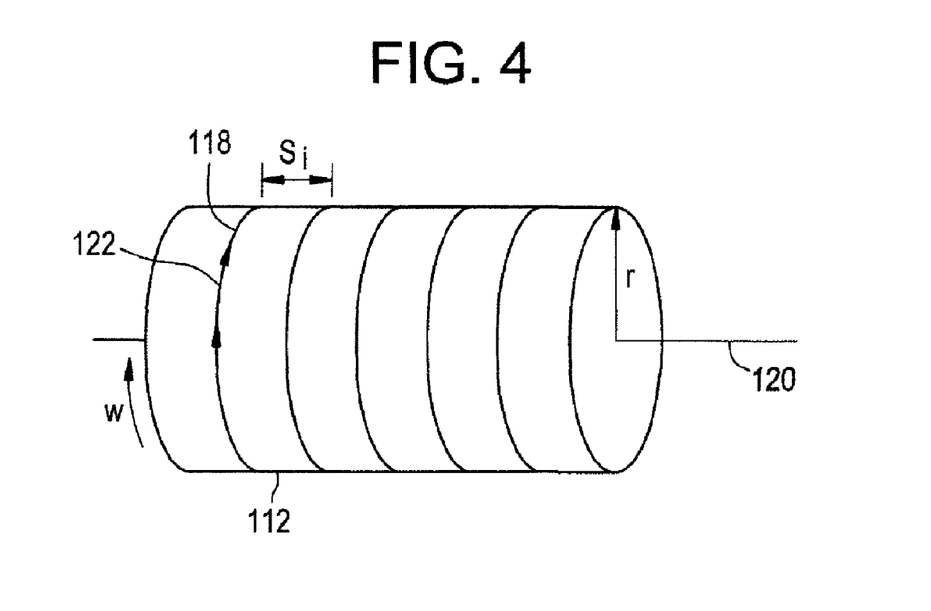
FIG. 4 is a diagram of the master drum of FIG. 1 having a random or pseudo random pattern therein over generally concentric rings.

In an alternative embodiment of the invention, as seen in FIG. 4, the drum 112 need not move along the z axis as the drum 112 rotates. As such, the cutting tool machines a randomized or pseudo randomized pattern along a series of i concentric rings 118 in the surface of the drum 112 whereby the cutting tool returns to a starting point 122 for each cutting pass. To achieve good cutting quality, a control system can allow the cutting tool 110 to repeat the pattern of any $i^{th}$ cutting pass for the number of revolutions depending upon the desired final cut depth and in-feed rate. When the cutting tool 110 finishes the number of revolutions and returns to the starting point 122 of the $i^{th}$ cutting pass, the cutting tool 110 is shifted or stepped a distance $S_i$ to the next, or $k^{th}$, cutting pass.

Figure 16:
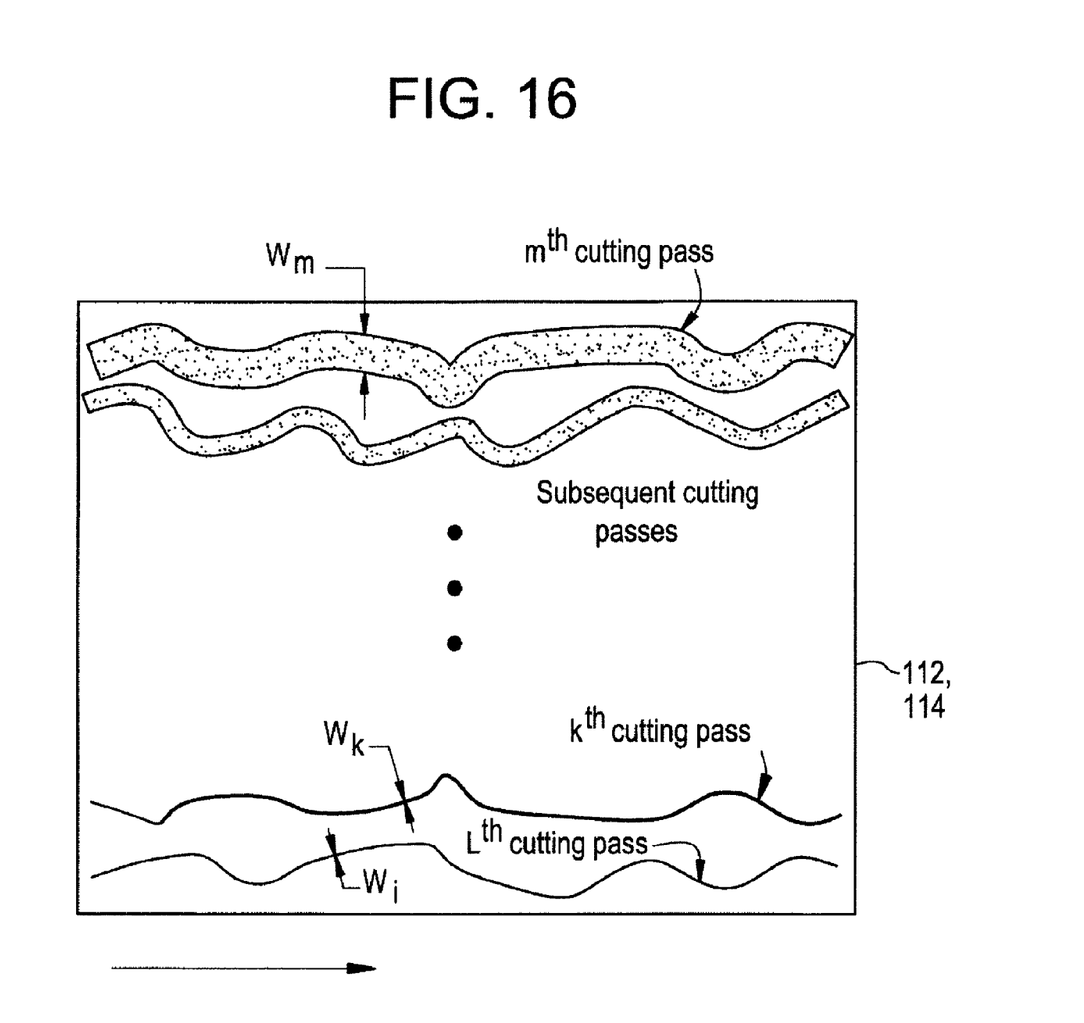
FIG. 16 is a depiction of a cutting gradient introduced into the surface of the machined surface of the workpiece.

It will be understood that the cutting tool 110 may have more than one axis of travel. For example it can have three axes of travel r, θ, z in cylindrical coordinates and x, y, z in rectilinear coordinates. Such additional axes will allow for the cutting of toroidal lens type structures when using a radiused cutting tool 110 or allow for a gradient in the cut along the cut length, for example. Translational axes r, θ, z and x, y, z will also allow for introducing a cutting gradient into the pattern machined into the surface of the workpiece 112, 114 for subsequent cutting passes. Such a cutting gradient is best seen with reference to FIG. 16. In FIG. 16, the $i^{th}$ cutting pass has a thickness or width of $w_i$ and the $k^{th}$ cutting pass has a thickness of $w_k$ where $w_i$ is greater or less than $w_k$. Furthermore, the $n^{th}$ cutting pass has a width of $w_n$ where $w_n$ is greater or less than $w_k$. It will be understood that the change in the thickness in the cutting pattern in subsequent cutting passes may be nonrandom, random or pseudo random. Additional rotational degrees of freedom (e.g., pitch 152, yaw 150 and roll 154, FIGS. 1, 2, 5 and 6) may be used to change the angular orientation of the cutting tool 110 with respect to the surface of the workpiece 112, 114, thus changing the geometry of the facets machined into the master surface.

The randomized or pseudo randomized pattern machined into the surface of the work piece 112, 114 is in the nature of a mathematical function defined over a segment, C, of a coordinate system and characterized by a set of random or pseudorandom parameters selected from the group consisting of amplitude, phase and frequency. For a rotating drum 112 the segment, C, over which the mathematical function is defined is the circumference of the drum 112. For a moving plate 114, the segment, C, over which the mathematical function is defined is a width or length of the plate 114. An exemplary mathematical function is that of the sine wave of Equation 1:

$$y_i = A_i \sin\{\Psi_i\} + S_i \quad (1).$$

wherein $y_i$ is the instantaneous displacement of the cutting tool relative to C on the $i^{th}$ cutting pass, $A_i$ is the displacement of the cutting tool relative to C, $\Psi_i$ is the phase of $y_i$ and $S_i$ is a shift in the starting position of $y_i$.

In Eq. (1), the phase, $\Psi_i$, is $$\Psi_i = \phi\left(\lambda_i - \frac{q_{i+k}}{2}\right) - \Phi_i \quad (2)$$

where $\phi$ is a number between zero and $2\pi$ radians inclusive. In order for the cutting tool 110 to return to the starting position 122 at the end of the $i^{th}$ cutting pass, the segment, C, over which the mathematical function is defined is equal to an integer number of half wavelengths, $\lambda_i$. Thus, for the $i^{th}$ cutting pass:

$$\frac{N}{2}\lambda_i = C \quad (3)$$

or $$\lambda_i = \frac{2 \times C}{N} \quad (4)$$

where N is a randomly or pseudo randomly chosen positive or negative integer. In Eq. (2), $$\frac{q_{i+k}}{2}$$

is an additive factor modifying $\lambda_i$ on a $k^{th}$ subsequent cutting pass and $\Phi_i$ is a randomly or pseudo randomly chosen number between zero and $2\pi$ radians inclusive.

Yet further in Eq. (1), the phase, $\Psi_i$, may be:

$$\Psi_i = \phi\left(\lambda_i - \frac{q_{i+k}}{2}\right) - \Phi_i - a_i \sin\left\{\phi\left(\frac{\lambda_i}{b_i} - \Omega_i\right)\right\} \quad (5)$$

where $a_i$ and $b_i$ are scalar quantities and $\Omega_i$ is a nonrandomly, randomly or pseudo randomly chosen number between zero and $2\pi$ radians inclusive.

Figure 13:
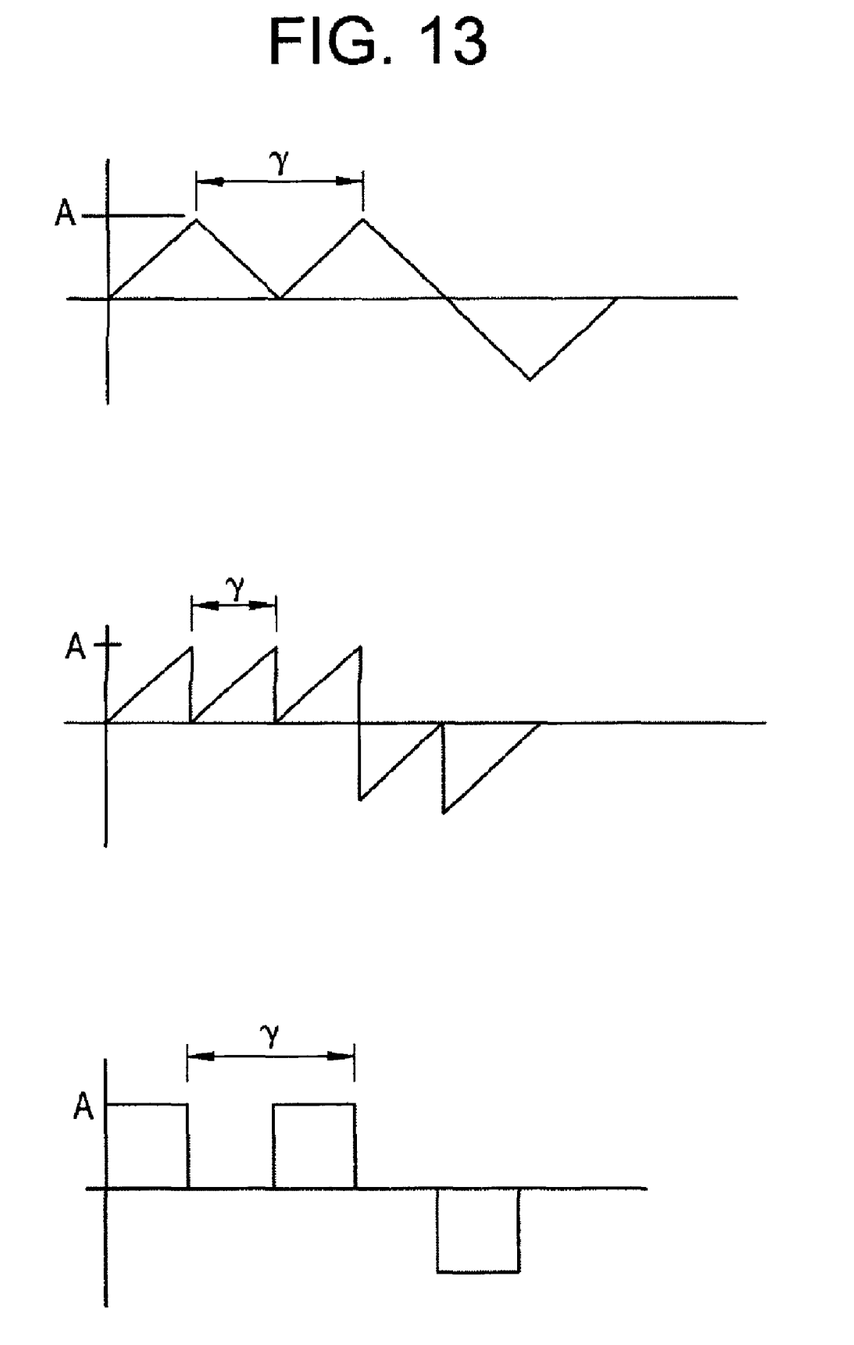
FIG. 13 is a graphical representation of mathematical functions.

It will be understood that the mathematical function referred to above may be any mathematical function that can be programmed into a computer numerically controlled (CNC) machine. Such functions include for example the well known triangular function, sawtooth function and square wave function (FIG. 13) each of which may be randomly modulated in amplitude, phase and frequency.

Figure 7:
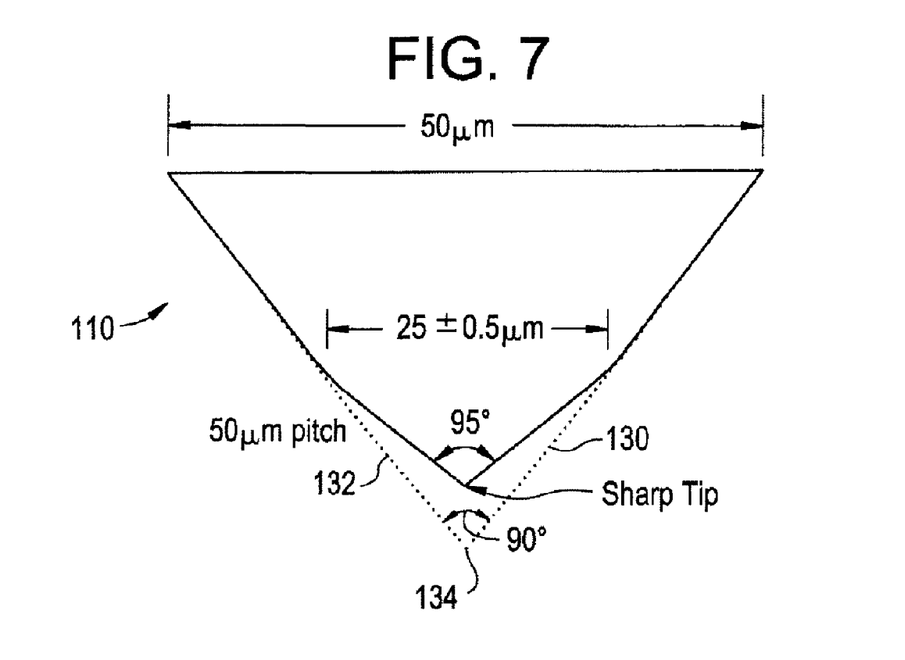
FIG. 7 is a diagram of a cross section of a cutting tool in the nature of a prismatic structure.
Figure 8:
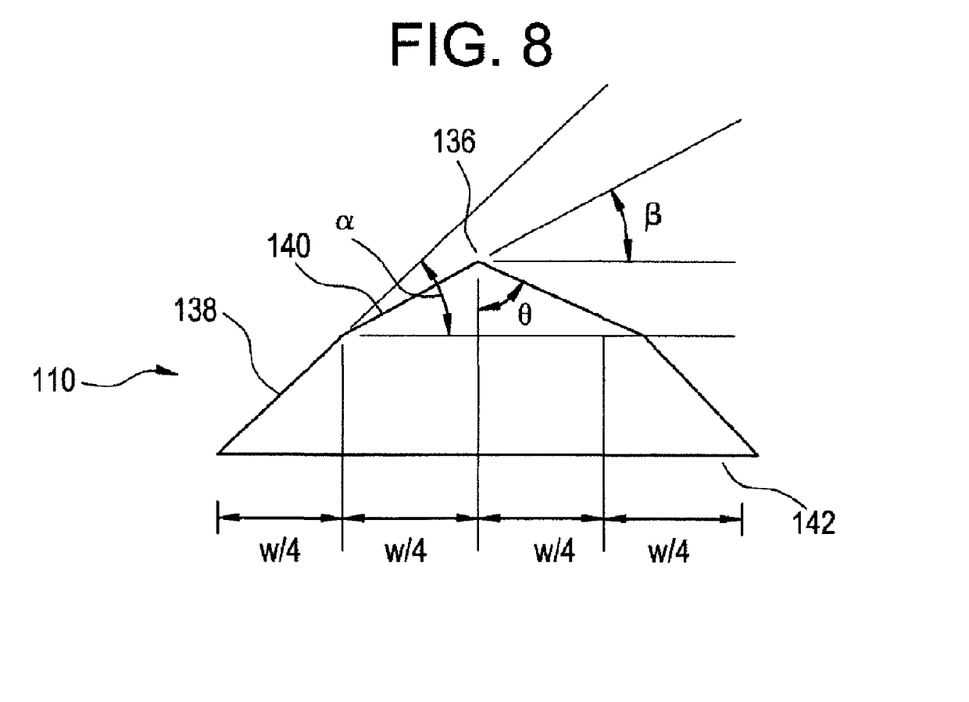
FIG. 8 is a diagram of the prismatic cutting tool of FIG. 5 having compound angled facets.
Figure 9:
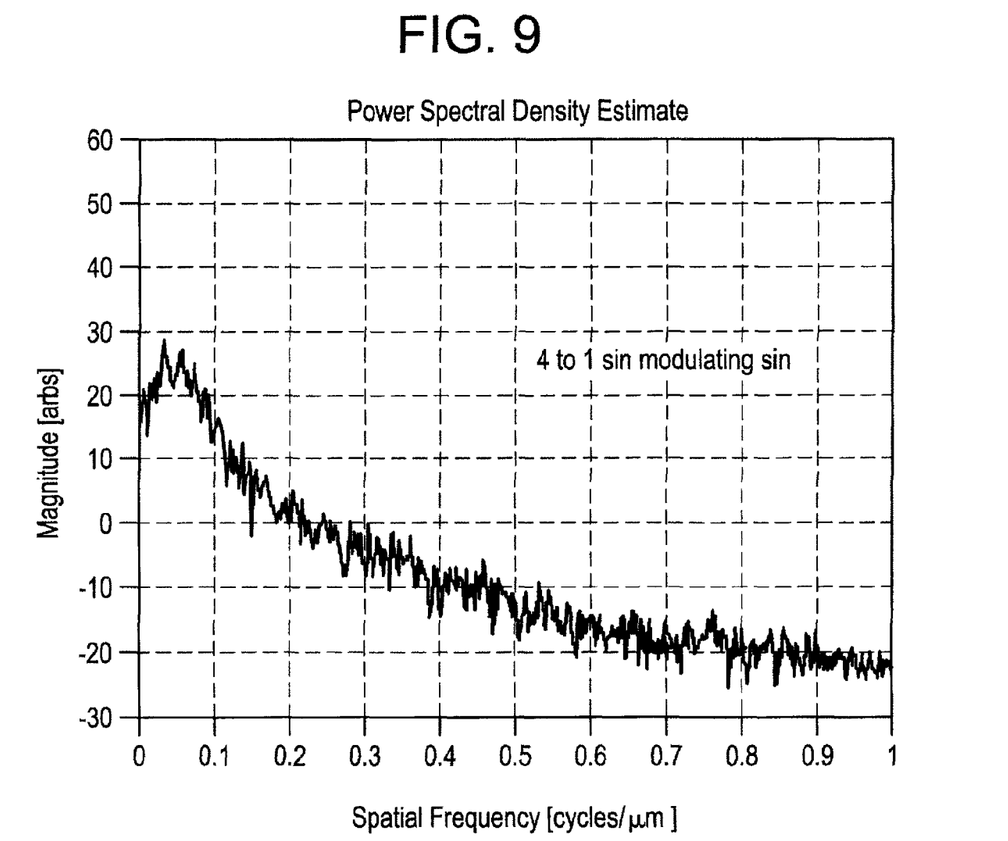
FIG. 9 is a graphical representation of the magnitude of the power spectral density of the randomized surface of the workpiece as a function of spatial frequency.

Referring to FIGS. 7 and 8, the cutting tool 110 comprises a prismatic structure having a cross section which may include straight facets 130, 132 intersecting at a tip 134 at a peak angle of $2\theta$. The prismatic shaped cutting tool 110 may also comprise linear segments 138, 140 of the facets 132, 134 resulting in a compound angled prism. The compound angle prism has a first facet 138 at an angle of $\alpha$ and a second facet 140 at an angle of $\beta$ with respect to a base 142 of the prism 110. As best understood from FIGS. 7 and 8, the cutting tool 110 may have a cross section with a rounded peak 134 or radius "r." In general the cutting tool can have a cross section of any manufacturable shape.

Figure 12:
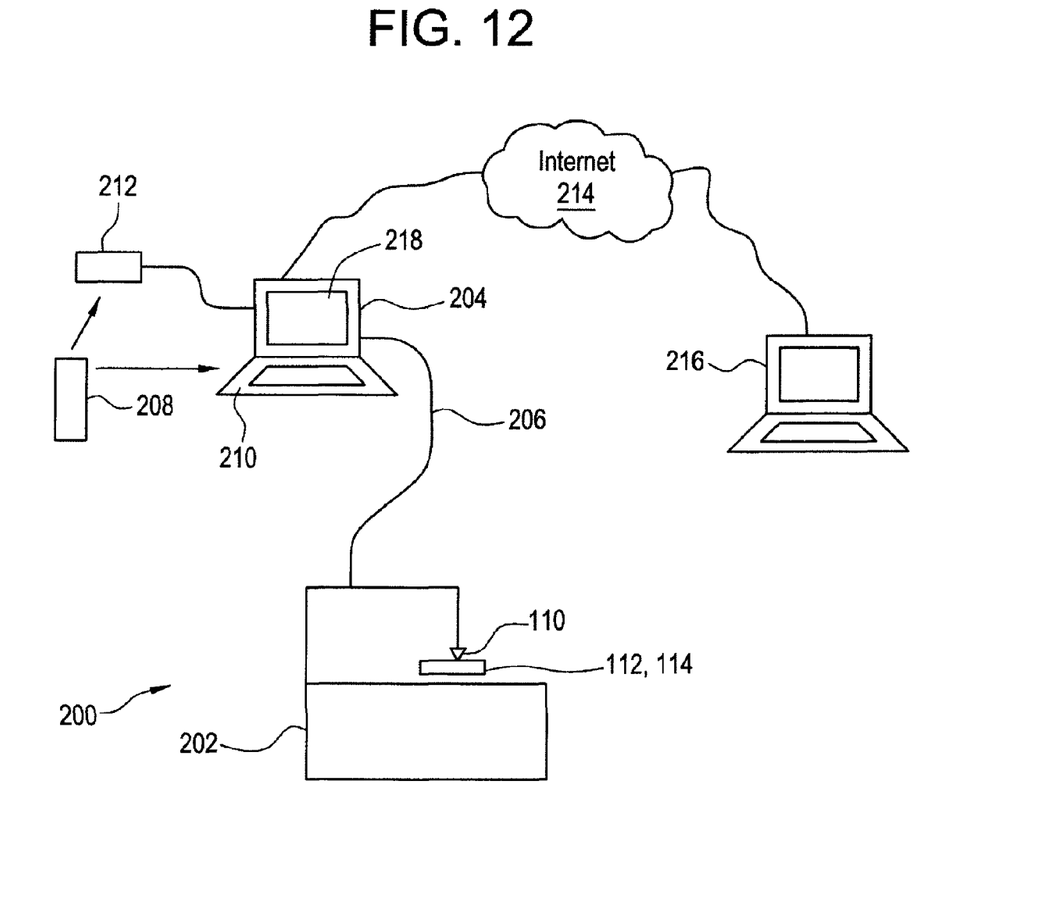
FIG. 12 is a schematic representation of a system and apparatus for machining the surface of a workpiece in communication over a communications or data network with remote locations.

The equipment needed to machine the surface of the workpiece 112, 114 in the invention is shown in FIG. 12. Machining the surface of the workpiece 112, 114 is accomplished by following a method that utilizes a computer numerically controlled (CNC) milling or cutting machine 202, having a cutting tool 110, which is controlled by a software program 208 installed in a computer 204. The software program 208 is written to control the movement of the cutting tool 110. The computer 204 is interconnected to the CNC milling machine 202 with an appropriate cabling system 206. The computer 204 includes a storage medium 212 for storing the software program 208, a processor for executing the program 208, a keyboard 210 for providing manual input to the processor, and a modem or network card for communicating with a remote computer 216 via the Internet 214 or a local network.

Figure 15:
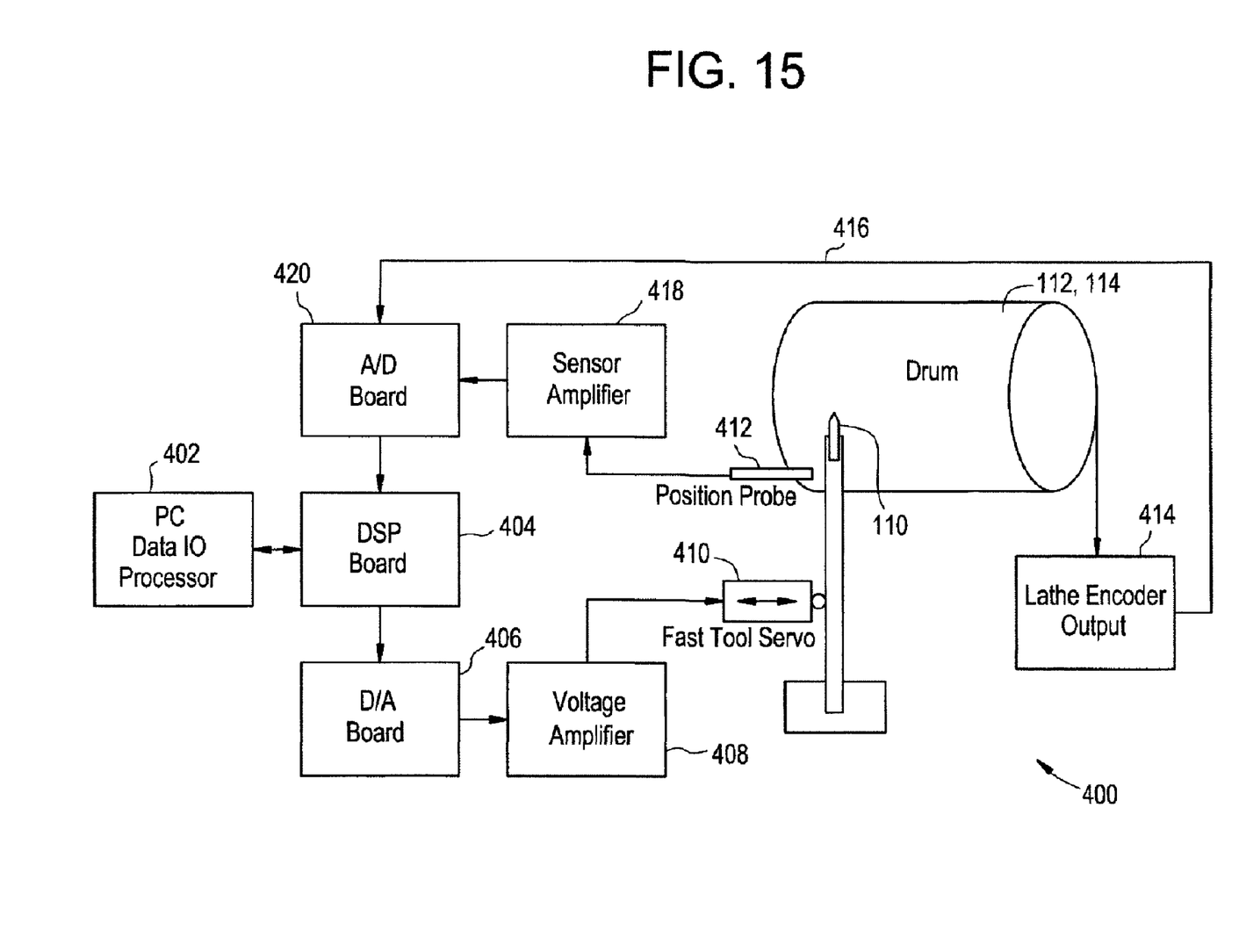
FIG. 15 is a schematic diagram of a master machining system with a fast tool servo for cutting grooves having lateral variations in the surface of a workpiece.

In FIG. 15, a master machining system with a fast tool servo for cutting grooves having lateral variations in the surface of a workpiece is shown generally at 400. An input/output data processor 402 provides cutting commands to a digital signal processing (DSP) unit 404 which supplies a signal to a digital-to-analog (DA) conversion device 406. A voltage amplifier 408 receptive of a signal from the DA converter 406 drives a fast tool servo mechanism 410 to direct the motion of the cutting tool 110. A cutting tool position probe 412 senses the position of the cutting tool 110 and provides a signal indicative of cutting tool position to a sensor amplifier 418 which amplifies the signal. The amplified signal is directed to an analog-to-digital (A/D) converter 420. A lathe encoder 414 determines the position of the workpiece (e.g., drum 112) and provides a feedback signal to the A/D converter 420. The A/D converter thus provides as output to the digital signal processing unit 404, a feedback signal indicative of the position of the cutting tool 110 and the position of the workpiece 112, 114 and the DSP unit 404 provides a processed signal to the input/output processor 402.

Following the method results in a randomly or pseudo randomly machined surface of the workpiece 112, 114. When the computer 204, having the software program 208 installed, is in communication with the CNC milling machine 202 an operator is ready to begin the method that will randomly or pseudo randomly machine the surface of the workpiece 112, 114. Following the method, the operator begins by providing as input the values of $A_i$ and $\Psi_i$ into the personal computer 204. The operator input can be provided manually by typing the values for $A_i$ and $\Psi_i$ using the keyboard 210. The mathematical function or functions (FIG. 13) may be stored within the computer's memory or may be stored on a remote computer 216 and accessed via the Internet 214 or via a local network.

The operator is prompted to provide the values of $A_i$ and $\Psi_i$ into the CNC machine 202. Once these values are provided, the cutting element 110 of the CNC machine 202 begins to mill the workpiece 112, 114. The commands provided by the software program 208 will precisely direct the cutting tool 110 to mill the workpiece 112, 114 accordingly. This is achieved by the monitoring of movement of the cutting tool 110 in an appropriate coordinate system. Additionally, the program 208 precisely controls the depth to which the milling process occurs. This is also achieved by the monitoring of the movement of the cutting tool 110 in the coordinate system. As best understood, the nonrandomized, randomized or pseudo randomized surface of the workpiece 112, 114 resulting from the cutting process may be in the form of a "positive" or a "negative" master.

From the master, an optical substrate 142 (FIG. 10) may be generated by forming a negative or positive electroform over the surface of the workpiece 112, 114. Alternatively, a molding material can be used to form a replica of the original positive or negative master—for example, a ultraviolet (UV) or thermal curing epoxy material or silicon material. Any of these replicas may be used as a mold for a plastic part. Embossing, injection molding, or other methods may be used to form the parts.

In surface metrology the autocorrelation function, R(x,y), is a measure of the randomness of a surface. Over a certain correlation length, $l_c$, however, the value of an autocorrelation function, R(x,y), drops to a fraction of its initial value. An autocorrelation value of 1.0, for instance, would be considered a highly or perfectly correlated surface. The correlation length, $l_c$, is the length at which the value of the autocorrelation function is a certain fraction of its initial value. Typically, the correlation length is based upon a value of 1/e, or about 37 percent of the initial value of the autocorrelation function. A larger correlation length means that the surface is less random than a surface with a smaller correlation length.

Figure 10:
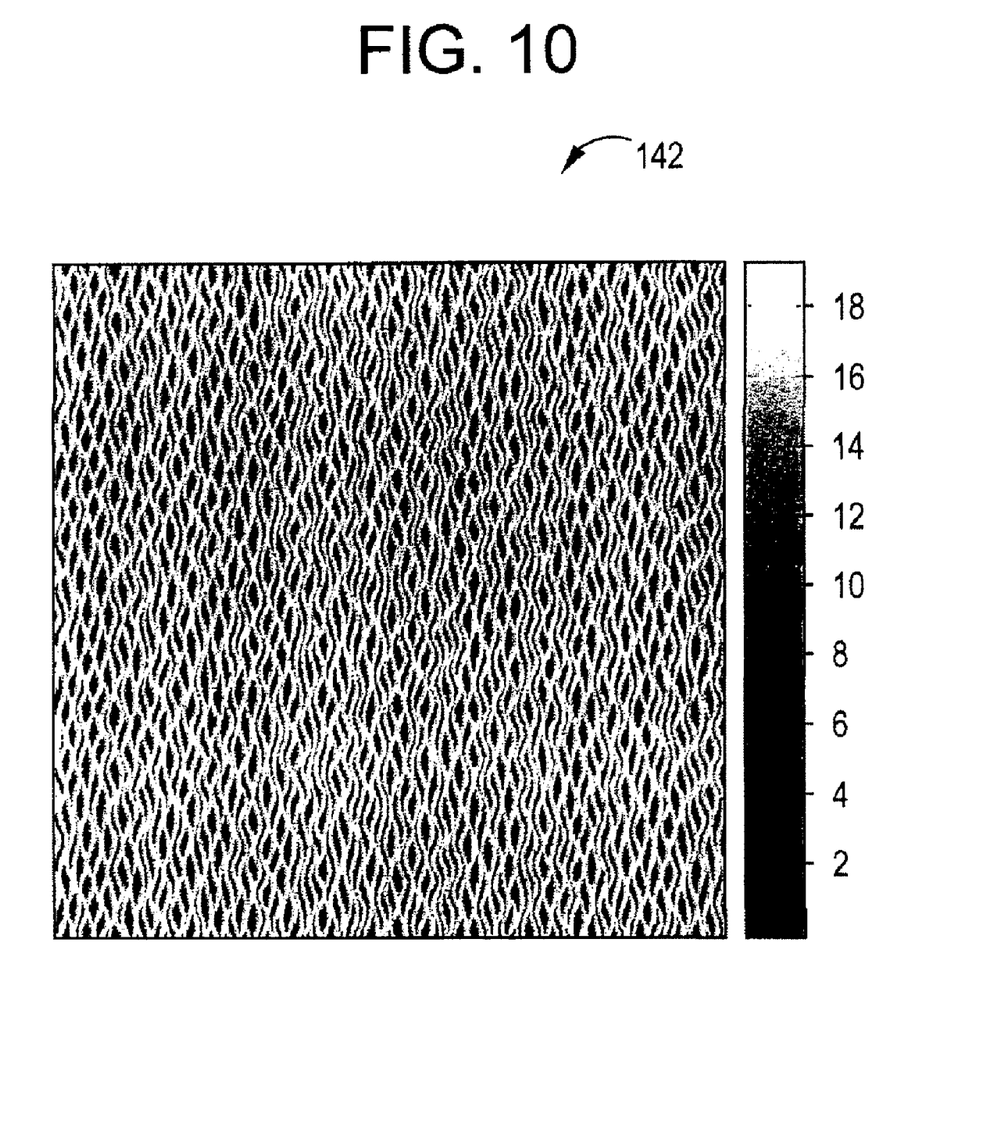
FIG. 10 is a top view of the randomized surface of the workpiece generated by the method of the invention.
Figure 11:
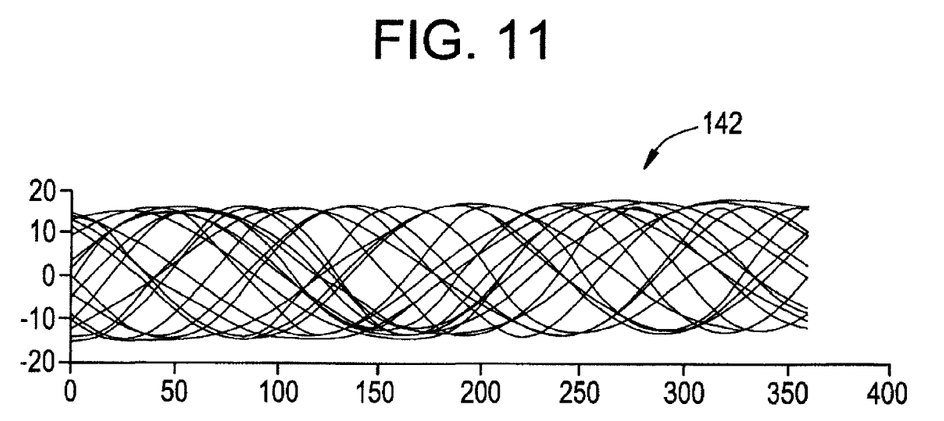
FIG. 11 is a graphical representation of a plurality of paths due to a plurality of cutting passes over the surface of the workpiece.

In some embodiments of the invention, the value of the autocorrelation function for the three-dimensional surface of the optical substrate 142 drops to less than or equal to 1/e of its initial value in a correlation length of about 1 cm or less. In still other embodiments, the value of the autocorrelation function drops to 1/e of its initial value in about 0.5 cm or less. For other embodiments of the substrate the value of the autocorrelation function along the length l drops to less than or equal to 1/e of its initial value in about 200 microns or less. For still other embodiments, the value of the autocorrelation function along the width w drops to less than or equal to 1/e of its initial value in about 11 microns or less.

Figure 14:
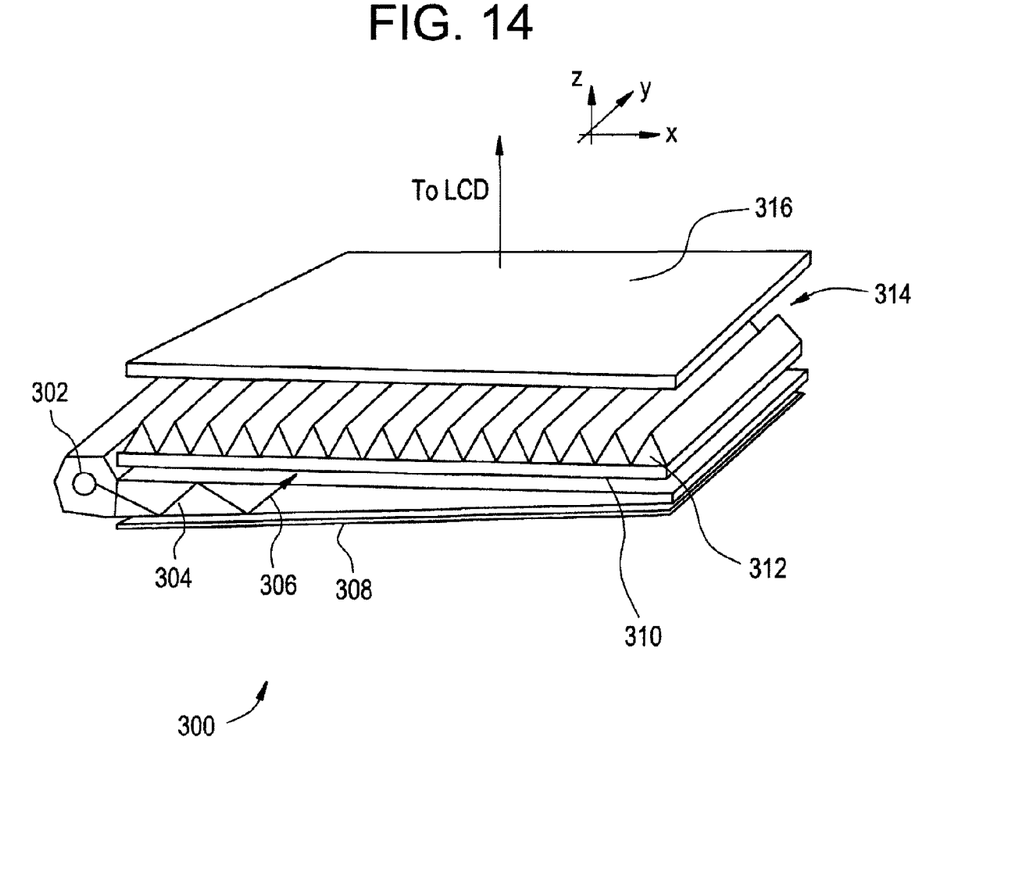
FIG. 14 is a three dimensional view of a backlight display device.

In FIG. 14 a perspective view of a backlight display 300 device is shown. The backlight display device 300 comprises an optical source 302 for generating light 306. A light guide 304 guides the light 306 therealong by total internal reflection (TIR). The light guide 304 contains disruptive features that cause the light 306 to escape the light guide 304. Such disruptive features may include, for example, a surface manufactured from a master having a cutting gradient machined therein as explained with regard to FIG. 16. A reflective substrate 308 positioned along the lower surface of the light guide 304 reflects any light 306 escaping from the lower surface of the light guide 304 back through the light guide 304 and toward an optical substrate 314 fabricated from a positive or negative master having a nonrandomized, randomized or pseudo randomized surface. At least one optical substrate 314 is receptive of the light 306 from the light guide 304. The optical substrate 314 comprises on one side thereof a planar surface 310 and on a second opposing side thereof a randomized surface 312 generated from the randomized surface of the workpiece 112, 114 (e.g., the master drum or master plate). The optical substrate 314 may also comprise a randomized surface of both sides thereof. The optical substrate 314 is receptive of the light 306 and acts to turn and diffuse the light 306 in a direction that is substantially normal to the optical substrate 314 along a direction z as shown. The light 306 is then directed to an LCD for display. A diffuser 316 may be located above the optical substrate 314 to provide diffusion of the light 306. This substrate 314 may be a retarder film that is used to rotate the plane of polarization of the light exiting the optical substrate 314 such that the light is better matched to the input polarization axis of an LCD. A half wave retarder, for example, may be used to rotate the substantially linearly polarized light exiting the optical substrate 314. The retarder may be formed by stretching a textured or untextured polymer substrate along one axis thereof in the plane of the substrate. Alternatively, a liquid or solid crystal device may be used. Alternatively, for this purpose the retarder film 316 could be built into the lower LCD substrate.

Any references to first, second, etc. or front and back, right and left, top and bottom, upper and lower, and horizontal and vertical, or any other phrase that relates one variable or quantity with respect to another are, unless noted otherwise, intended for convenience of description, not to limit the present invention or its components to any one positional or spatial orientation. All dimensions of the components in the attached Figures can vary with a potential design and the intended use of an embodiment without departing from the scope of the invention.

While the invention has been described with reference to several embodiments thereof, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A method of fabricating an optical substrate from a machined master surface of a workpiece, the method comprising:
   forming a replica of the master surface; and
   transferring the replica of the master surface to an optical substrate;
   wherein the master surface is formed by:
      bringing a cutting tool into contact with an initial surface of the workpiece;
      for a cutting pass, i, causing relative movement between the cutting tool and the initial surface along a path;
      wherein the path is determined by processing a mathematical function defined over a segment, C, of a coordinate system and characterized by a parameter selected from the group consisting of amplitude, phase, and frequency;
      wherein causing relative movement between the cutting tool and the initial surface comprises:
         bandpass filtering a noise signal;
         providing the bandpass filtered noise signal to a function generator; and
         generating a randomly modulated mathematical function from the function generator;
         cutting the initial surface by moving the cutting tool along the path according to the randomly modulated mathematical function.

2. The method of claim 1, wherein the forming the replica of the master surface comprises forming an electroform over the master surface.

3. The method of claim 1, wherein the forming the replica of the master surface comprises disposing an ultraviolet (UV) curing epoxy material on the master surface.

4. The method of claim 1, wherein the forming the replica of the master surface comprises disposing a thermal curing epoxy material on the master surface.

5. The method of claim 1, wherein the forming the replica of the master surface comprises disposing a silicon material on the master surface.

6. A method of fabricating an optical substrate from a machined master surface of a workpiece, the method comprising:
   forming a replica of the master surface; and
   transferring the replica of the master surface to an optical substrate;
   wherein the master surface is formed by:
      bringing a cuffing tool into contact with an initial surface of the workpiece;
      for a cuffing pass, i, causing relative movement between the cutting tool and the initial surface along a path;

wherein the path is determined by processing a mathematical function defined over a segment, C, of a coordinate system and characterized by a parameter selected from the group consisting of amplitude, phase, and frequency;

and wherein the mathematical function is defined by the equation:

$$y_i = A_i \sin\{\Psi_i\} + S_i$$

wherein i is an integer indicative of the number of the path, $y_i$ is an instantaneous displacement of the cutting tool relative to C on the $i^{th}$ cutting pass, $A_i$ is a maximum displacement of the cutting tool relative to C, $\Psi_i$ is a phase of $y_i$, and $S_i$ is a shift in the starting position of $y_i$;

and wherein $$\Psi_i = \phi\left(\lambda_i - \frac{q_{i+k}}{2}\right) - \Phi_i$$

where φ is a number of zero to 2π, inclusive;

$$\lambda_i = \left(\frac{2 \times C}{N}\right)$$

where N is an integer;

$$\frac{q_{i+k}}{2}$$

is an additive factor modifying $\lambda_i$, on a $k^{th}$ subsequent cutting pass and $\Phi_i$ is a number of zero to 2π, inclusive.

7. A method of fabricating an optical substrate from a machined master surface of a workpiece, the method comprising:
   forming a replica of the master surface; and
   transferring the replica of the master surface to an optical substrate;
   wherein the master surface is formed by:
      bringing a cutting tool into contact with an initial surface of the workpiece;
      for a cutting pass, i, causing relative movement between the cutting tool and the initial surface along a path;
   wherein the path is determined by processing a mathematical function defined over a segment, C, of a coordinate system and characterized by a parameter selected from the group consisting of amplitude, phase, and frequency;
   and wherein the mathematical function is defined by the equation:

$$y_i = A_i \sin\{\Psi_i\} + S_i$$

wherein i is an integer indicative of the number of the path, $y_i$ is an instantaneous displacement of the cutting tool relative to C on the $i^{th}$ cutting pass, $A_i$ is a maximum displacement of the cutting tool relative to C, $\Psi_i$ is a phase of $y_i$, and $S_i$ is a shift in the starting position of $y_i$;

and wherein $$\Psi_i = \phi\left(\lambda_i - \frac{q_{i+k}}{2}\right) - \Phi_i - \alpha_i \sin\left\{\phi\left(\frac{\lambda_i}{b_i} - \Omega_i\right)\right\}$$

where φ is a number of zero to 2π, inclusive;

$$\lambda_i = \left(\frac{2 \times C}{N}\right)$$

where N is an integer;

$$\frac{q_{i+k}}{2}$$

is an additive factor modifying $\lambda_i$, on a $k^{th}$ subsequent cutting pass and $\Phi_i$, is a number of zero to 2π, inclusive, $\alpha_i$, and $b_i$ are scalar quantities and $\Omega_i$ is a number of zero to 2π, inclusive.

8. The method of claim 6, wherein N is a positive integer.

9. The method of claim 7, wherein N is a positive integer.

* * * * *